United States Patent [19]

Trinh

[11] 4,366,340

[45] Dec. 28, 1982

[54] COMPOSITE PROFILE SPACER FOR COMPRESSED GAS INSULATED CO-AXIAL ELECTRICAL CABLES

[75] Inventor: Ngoc-Giao Trinh, Boucherville, Canada

[73] Assignee: IREQ - Institut de Recherche de l'Hydro-Quebec, Quebec, Canada

[21] Appl. No.: 129,700

[22] Filed: Mar. 13, 1980

[51] Int. Cl.³ .......................... H01B 9/04; H01B 9/06; H01B 17/58; H02G 5/06

[52] U.S. Cl. .................................. 174/28; 174/22 C; 174/167

[58] Field of Search ...................... 174/16 B, 22 C, 28, 174/111, 167; 333/244

[56] References Cited

U.S. PATENT DOCUMENTS 3,898,367 8/1975 Nakata .............................. 174/28 X
3,898,368 8/1975 Durschner et al. .................... 174/28
3,962,609 6/1976 Chaudhuri ......................... 174/28 X

FOREIGN PATENT DOCUMENTS 2526668 12/1976 Fed. Rep. of Germany ........ 174/28
684621 9/1979 U.S.S.R. ................................. 174/28

OTHER PUBLICATIONS

Cronin, John C. and Perry, E. R., "Optimization of Insulators for Gas Insulated Systems", Transactions IEEE, vol. PAS-92, 1973, pp. 558-564.

Primary Examiner—Laramie E. Askin
Attorney, Agent, or Firm—Oblon, Fisher, Spivak, McClelland & Maier

[57] ABSTRACT

A composite profile spacer for use in compressed gas insulated co-axial electrical cables. The cables have a central conductor and an outer envelope conductor and an insulating gas contained therebetween. The spacer comprises a composite profile shaped body formed of an electrically insulating material and extends radially between the central conductor and the envelope conductor to support the central conductor substantially concentric with the envelope conductor. The body has a disc section configuration in a first support section adjacent the central conductor, and a cone-section configuration in a remaining support section extending to the envelope conductor whereby to obtain substantially uniform field distribution and low field intensity on the opposed surfaces of the spacer. The contact angle between the opposed surfaces and the central conductor is approximately 75° and the insulating material is an epoxy having a relative dielectric constant of 5 or higher.

10 Claims, 13 Drawing Figures

COMPOSITE PROFILE SPACER FOR COMPRESSED GAS INSULATED CO-AXIAL ELECTRICAL CABLES

BACKGROUND OF INVENTION (a) Field of the Invention

The present invention relates to an improved spacer, and more particularly to a composite profile shaped spacer for use in compressed gas insulated coaxial electrical cables to support a central conductor substantially concentric with an outer envelope conductor and wherein the spacer has substantially uniform field distribution and low field intensity on the opposed surfaces thereof.

(b) Description of Prior Art

With the rapid development of compressed gas insulated (CGI) cables and switchgear in recent years, underground transmission at EHV levels of 500 kV and above is becoming one of the alternatives to the problem of supplying energy to large urban areas. Several factors have been observed to affect the dielectric performance of the CGI cable. These factors are the electrode surface condition, the particle contamination and the presence of dielectric spacers. The latter aspect is of particular importance since solid-dielectric spacers are an integral part of the cable, and as such, they should be properly designed to minimize the degradation in the dielectric performance of the cable.

Several studies have been made on EHV cables with compressed $SF_6$ insulation, in the last few years. Field calculations are extensively used in these studies. The optimization criteria vary, however, considerably from these studies. The results obtained are, therefore, far from sufficient to establish a universal configuration for epoxy spacers as illustrated by the large variety of epoxy spacer configurations in commercial use.

SUMMARY OF INVENTION

It is a feature of this invention to improve the dielectric performance of epoxy spacers by properly shaping the gas-dielectric interfaces. More particularly, the invention is advantageous with coaxial cables, which are used extensively in EHV cables, and to spacers of the gas barrier type. Optimization of the spacer profile was undertaken theoretically, based on the calculations of the potential and field distributions along the spacer interface. The results were verified experimentally with tests on a coaxial conductor of 2.54/7.0 cm, in which the dielectric performance of the conductor with spacer was compared to the intrinsic performance of the conductor without spacer.

Because of the dielectric discontinuity introduced by the epoxy spacer in the gap between the central conductor and its envelope, the potential and field distributions at and near the spacer surface are not the same as in the gas gap. Proper definition of the potential and field distributions at the spacer surface is therefore essential for optimization of the spacer profile. This was done theoretically using a charge simulation method. A brief description of this computation method is given herein.

According to the above features, from a broad aspect, the present invention provides a spacer. The spacer comprises a composite profile shaped body formed of an electrically insulating material to support a central conductor substantially concentric in a tubular outer sheath. The body has a disc section configuration in first support section to be located immediate the central conductor to obtain substantially uniform field distribution at the first support section. The disc section has opposed convergent surfaces extending substantially symmetrically in the first support section. The body further has a cone-section configuration in a remaining support section which is to extend to the outer sheath to obtain a low field intensity on the opposed surfaces of the spacer in the remaining support section. A contact angle is defined between each of the opposed convergent surfaces and the central transverse axis of the spacer, inwardly of the opposed convergent surfaces, and being in the range of about 65° to 80°.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
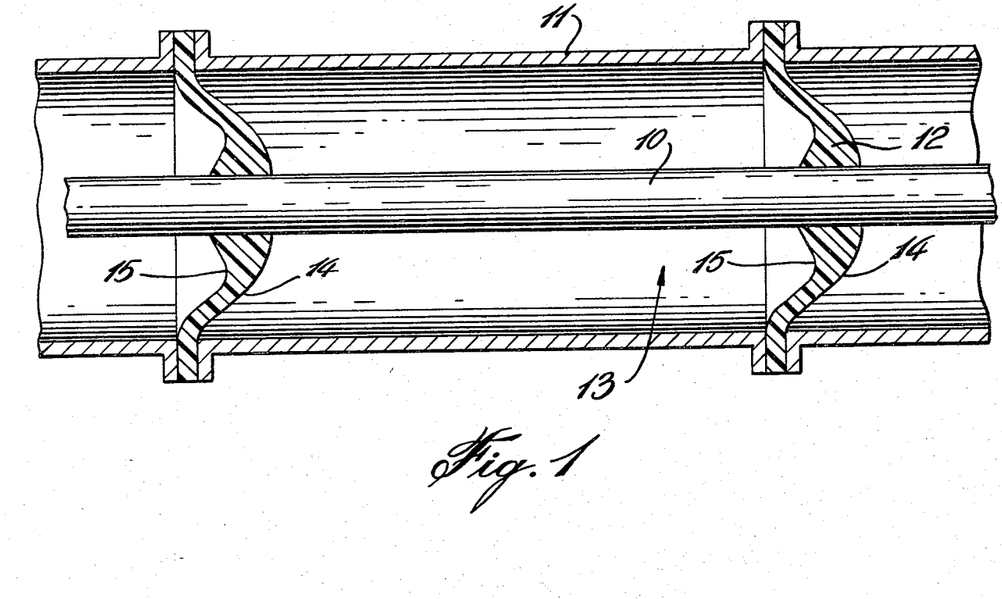
FIG. 1 is a cross-sectional view of a coaxial compressed gas insulated cable incorporating the composite profile spacer of the present invention.

Referring to FIG. 1, the illustrated bus comprises a tubular metallic conductor 10 located at the centre of a tubular metal sheath 11. The relative position of the conductor 10 and the sheath 11 is assured by insulating spacers 12 located at regular intervals along the conductor 10. Both the conductor 10 and the sheath 11 are made up of a plurality of sections connected together in end to end relationship with the supporting spacers 12 serving also as a gas barrier between two adjacent sections.

Figure 3:
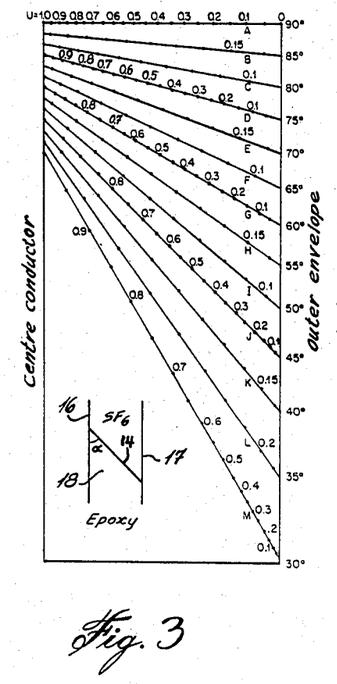
FIG. 3 is a graph showing the potential distributions at the dielectric-gas interface ($\alpha \leq 90°$)
Figure 4:
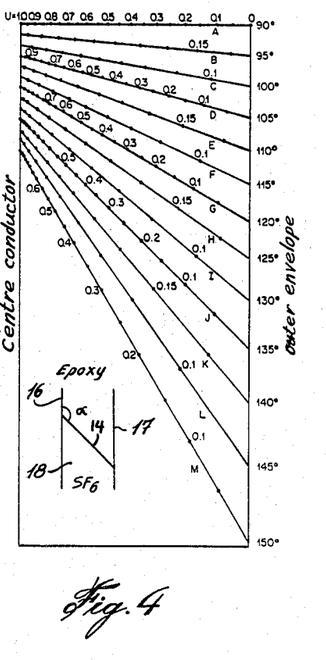
FIG. 4 is a graph showing the potential distributions at the dielectric-gas interface ($\alpha \geq 90°$)

Under normal operating conditions, the conductor 10 is subjected to a high potential while the sheath 11 is at ground potential. The dielectric insulation of the bus is assured by a high dielectric strength, pressurized gas 13 such as sulfur hexafluoride, $SF_6$, and by the insulating spacers 12. It is well known that these supporting spacers 12, if not properly designed, can greatly impair the dielectric performance of the compressed gas-insulated bus. Furthermore, the dielectric performance of the insulating spacers 12 is largely dependent on the distribution of the electric field and potential along the gas-dielectric interfaces 14,15. These distributions can differ considerably from that prevailing in the gas 13. Typical examples of such distributions of the electric potential along a gas-dielectric interface 14,15 are presented in FIGS. 3 and 4. The calculation was made assuming a single conical interface 14 for various values of the dielectric cone angle $\alpha$ and using the charge simulation method introduced by H. Singer, H. Steinbigler, P. Weiss, "A Charge Simulation Method for the Calculation of High Voltage Fields", IEEE Trans. Vol. PAS-93, Sept./Oct. 1974, pp. 1660–1668. The relative dielectric constant $\epsilon_r$ of epoxy was taken as $\epsilon_r = 5$. Also, an optimum ratio of the radius $r_i$ of the central conductor 16 to that of the outer sheath 17 $r_o$ of $r_o/r_i = e = 2.718$ was assumed, which assures a minimum nominal field intensity at the surface of the central conductor 16. It can be seen that in general, the field distribution is not uniform over the dielectric interface. For small values of the dielectric cone angle $\alpha$, an enhancement of the field is observed near the outer envelope-epoxy-$SF_6$ junction (FIG. 3), whereas for large values of $\alpha$, the field enhancement occurs near the inner conductor-epoxy-$SF_6$ junction. A transition range can be defined for values of $\alpha$ between 55° and 80° where the field distribution along the dielectric-gas interface is fairly uniform.

Figure 5:
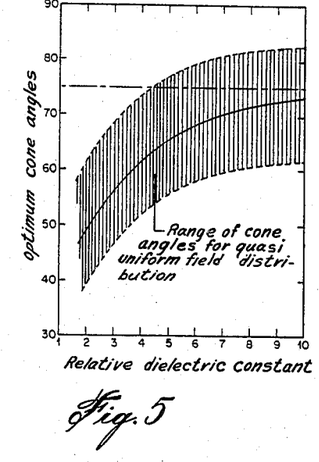
FIG. 5 is a graph showing the variations of the optimum angle with $\epsilon_r$.

The range of dielectric cone angle $\alpha$ for quasi-uniform field distribution along the dielectric-gas interface was found to vary with the relative dielectric constant $\epsilon_r$ of the epoxy resin. This is illustrated in FIG. 5, presenting the variations of the optimal range of the dielectric-cone angle $\alpha$ with the relative dielectric constant $\epsilon_r$. It can be seen that the optimum angles increase with $\epsilon_r$ and approach a limiting range of $\alpha$ between 65° and 85° for large values of $\epsilon_r$.

Figure 2:
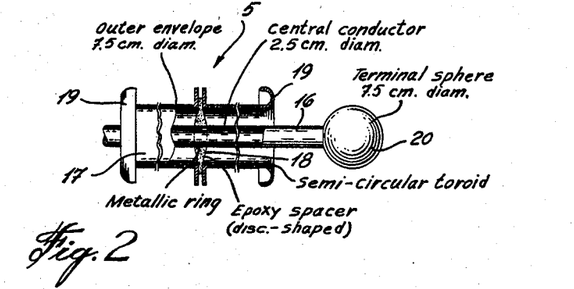
FIG. 2 is a fragmented side view showing the test conductor arrangement.

To illustrate the importance of the profile of the spacer's dielectric-gas interfaces 14,15 on its dielectric performance, two basic spacer configurations corresponding to a disc- and a cone-shaped spacer, were evaluated experimentally using a test conductor system illustrated in FIG. 2.

The test conductor system consists of a coaxial conductor 5, 2.54 cm and 7.0 cm in diameter as illustrated in FIG. 2. Both the central conductor 16 and its sheath 17 comprise two sections. These sections can be fixed together to form a 60 cm long test conductor, or connected to a central epoxy spacer 18 to simulate a gas barrier. To minimize the end effect of the test conductor, the sheath is terminated at both ends with semi-circular toroids 19 while the central conductor is made intentionally longer and terminated with a 7.5 cm sphere 20. Particular care was also taken to provide the test conductor with a mirror-finish surface. From the measured breakdown voltages, the surface roughness was estimated to be better than 10 $\mu$m.

The dielectric performance of the supporting spacer 18 was evaluated by comparing the critical withstand voltage of the 2.54/7.0 cm test conductor (FIG. 2) with and without the spacer 18. Particular precautions were therefore taken in the preparation of the test conductor to assure the best intrinsic dielectric performance of the spacer-less conductor system which will be taken as a reference. Since the optimization procedure is based on control of the field distribution (dependent on geometric parameters only) at the spacer surface by properly shaping the spacer profile, it seems reasonable to presume that the experimental results obtained will nevertheless apply to larger CGI cables.

Figure 6:
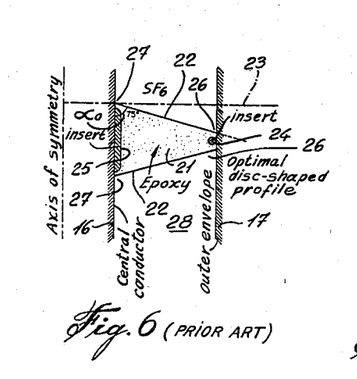
FIG. 6 is a section view showing a prior art disc-shaped spacer profile.

Referring to FIG. 6, there is shown a prior art disc-shaped spacer 21, with both interfaces or opposed surfaces 22 adjusted to the same dielectric-cone angle, appears as the most suitable configuration to take advantage of the optimum angle defined above. However, to minimize the epoxy volume of the spacer 21, the dielectric-cone angle of the latter should be close to 90° (see axis 23). An optimum angle of $\alpha_o = 75°$ was adopted, taking into account the fact that the dielectric constant $\epsilon_r$ of epoxy resins is about 5 or higher. Several such spacers 21 were molded and tested. All spacers 21 were molded on a metal ring 24, 2.54 cm in diameter using a partial-vacuum procedure.

The epoxy formulation, supplied by CIBA-GEIGY Corp., was 1 pbw of a combined bisphenolic and heterocyclic resin, 1 pbw of hardener and 4 pbw of tabular alumina filler which has been verified as being most appropriate for this application. C. H. de Tourreil, H. St-Onge: "Evaluation of Epoxy Resin Formulations in $SF_6$ Cable Spacer Materials", 1978 IEEE International Symposium on Electrical Insulation, Philadelphia, June 1978.

Figure 7:
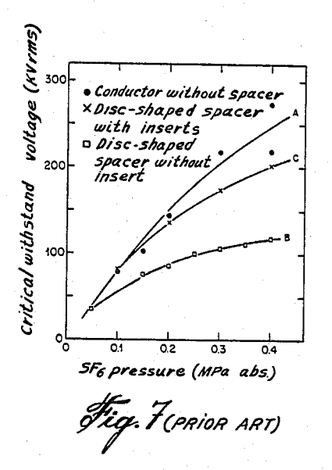
FIG. 7 is a graph showing the dielectric performance of disc-shaped spacer under ac voltages.

Typical results obtained are presented in FIG. 7, which compares the critical withstand voltages of the test conductor with and without spacers 21 at gas pressures up to 0.4 MPa. It can be seen that the presence of the epoxy spacer 21 significantly reduces the dielectric performance of the test conductor (curves A,B). At the nominal operating gas pressure of 0.4 MPa, the critical withstand voltage is only 130 kV rms or about 55% of the intrinsic dielectric performance of the conductor.

A close examination of the traces left on the epxoy interface by successive flashovers occurring during the tests indicates that a considerable number of flashovers are actually initiated from the outer envelope-epoxy-$SF_6$ junction 26. Such behaviour of the flashover can be attributed to the uniform field distribution along the spacer interface 22. The outer junction 26 is therefore relatively more capable of initiating partial discharges and flashovers of the gas gap than the inner junction 27, as a result of its longer circumference.

One way to improve the dielectric performance of the spacer 21 is to artificially reduce the local field intensity at the metal-epoxy-$SF_6$ junctions, thus minimizing their ability to initiate flashovers. This is achieved in practice by means of metal inserts 24 and 25 embedded in the epoxy near the junctions as illustrated in FIG. 6. A number of disc-shaped spacers 21 were molded with metal inserts and tested. The summarized results (FIG. 7, curve C) represent the variations in the critical withstand voltage with the gas pressure. It may be observed that the addition of metal inserts significantly improves the dielectric performance of the spacer. At 0.4 MPa, the critical withstand voltage is 200 kV rms or 85% of the intrinsic dielectric performance of the test conductor.

The results of a few additional tests made with spacers having only the outer metal insert 24 show practically the same improvement in the critical withstand voltage. This indicates the important role of the outer envelope-epoxy-$SF_6$ junction 26 in initiating flahsovers and the need to control the local field intensity at this junction.

Figure 8:
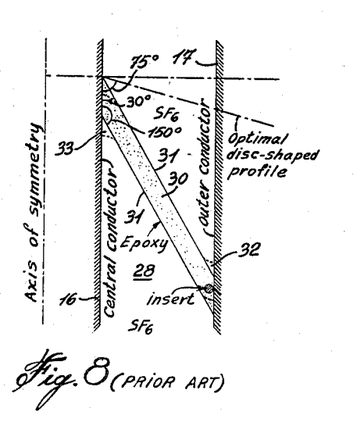
FIG. 8 is a section view showing a cone-shaped spacer profile.

The good dielectric performance of disc-shaped spacers 21 is related to the uniform field distribution along the spacer interfaces and to the control of the local field intensity at the metal-epoxy-SF$_6$ junctions by means of metal inserts. The main limitation of prior art disc-shaped spacers is due to the short leakage distance which, at the optimum dielectric-cone angle $\alpha_o = 75°$, amounts to only 1.04 times the radial gas gap 28. The latter drawback does not exist with prior art cone-shaped spacers 30 as shown in FIG. 8 where the leakage distance (the interface 31) can be increased considerably with respect to the radial gas gap. Non-optimum angles of the dielectric cone are used, however, which results in non-uniform field distributions along the epoxy-gas interfaces 31.

To evaluate the effectiveness of an increased leakage distance in improving the dielectric performance of epoxy spacers, a number of cone-shaped spacers 30 were molded and tested. The cone angle of 30° gave the spacers a leakage distance that was twice the radial gas gap. Because of the parallel interfaces 31 of the spacers 30, the dielectric-cone angle $\alpha$ is not the same at the two interfaces 31; in this case, it is 30° and 150° at the upper and lower interfaces respectively. Referring to the results of FIGS. 3 and 4, an enhancement in the field distribution occurs near the outer envelope-epoxy-SF$_6$ junction at the upper interface 32 and near the inner conductor-epoxy-SF$_6$ junction at the lower interface 33.

Figure 9:
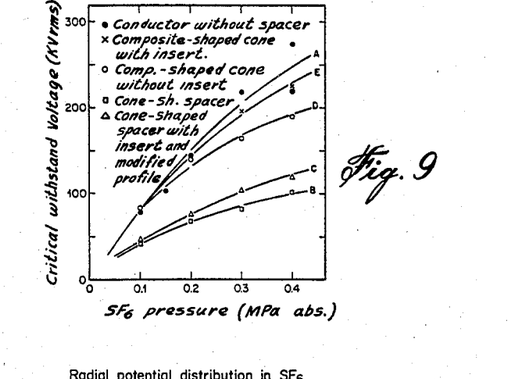
FIG. 9 is a graph showing the dielectric performance of cone-shaped spacers under ac voltages.

Typical variations of the withstand voltage of cone-shaped spacers as a function of the gas pressure are presented in FIG. 9 and compared with the intrinsic dielectric performance of the test conductor. It can be seen that, in spite of a longer leakage distance, the critical withstand voltage of cone-shaped spacers is only 100 kV rms at 0.4 MPa, or about 43% of the dielectric performance of the spacer-less conductor.

Examination of the traces left by successive flashovers during the test shows that all the flashovers developed along the lower spacer interface, initiating from both metal-epoxy-SF$_6$ junctions. The non-uniform field distribution along the spacer interfaces 31 and the poor contact condition at the outer envelope-epoxy-SF$_6$ junction seem to be responsible for the low critical withstand voltage of the cone-shaped spacers. Various attempts were made to improve the dielectric performance, including the use of metal inserts and the modification of the contact angle near the junction as illustrated by the dotted lines in FIG. 8. The improvement achieved (FIG. 9, curve C), is perceptible but remains marginal compared to the dielectric performance already obtained with optimum disc-shaped spacers. It can therefore be concluded that:

the increased leakage distance of non-optimum cone-shaped profile is more than offset by the non-uniform field distribution at the dielectric-gas interface;

the small contact angle at the junctions reduces the shielding efficiency of the metal insert, as this is located too far from the junction to be protected.

Figures 11, 12, 13:
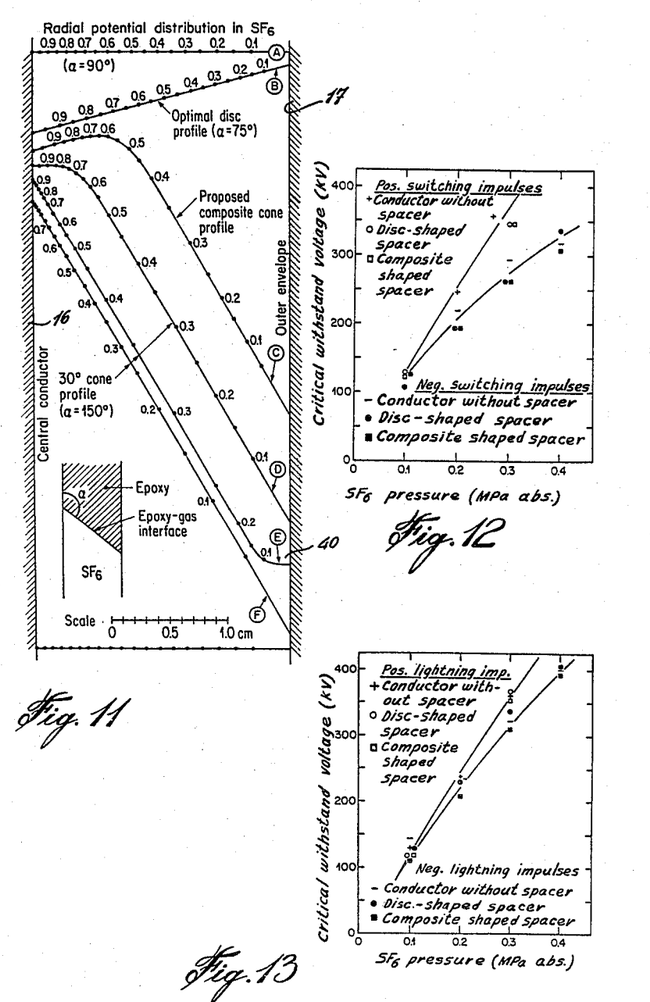
FIG. 11 is a graph showing the potential distributions at composite-shaped dielectric-gas interfaces.
FIG. 12 is a graph showing the dielectric performance of optimum spacers under switching impulse voltages.
FIG. 13 is a graph showing the dielectric performance of optimum spacers under lightning impulse voltages.

These disadvantages of the prior art are overcome by the present invention which provides a composite-shaped cone spacer 35 (see FIG. 10) with a modified contact angle of the profile at the metal-epoxy-SF$_6$ junctions 36 and 37. This improvement is not only in the field distribution uniformity but also in the shielding efficiency of the metal insert 38 at the junction, which has been brought closer to the insert. The resulting profile is no longer a pure cone shape, as shown in FIG. 8. Extensive field calculations were made for these composite-shaped profiles 35, assuming a single dielectric-gas interface 39. Typical results are presented in FIG. 11 which compares the calculated potential distributions along different composite-shaped profiles (curves C, D, E). For purposes of comparison, the radial field distributions in the gas, along an optimum disc-shaped interface and a 30° cone-shaped profile are also presented (curves A, B, F). The following observations can be made:

significant improvement is obtained in the uniformity of the field distribution along a composite-shaped profile (curves C, D) compared with a cone-shaped profile (curve F);

the best result is obtained when the contact angle is equal to the optimum value $\alpha_o = 75°$ (curve C). The field distribution near the central conductor is then comparable to, although slightly higher than, the field along an optimum disc-shaped interface;

an improved shielding efficiency at the outer envelope-epoxy-SF$_6$ junction 40 by means of a 90° contact angle (curve E) is accompanied by an increase in the local field intensity along the composite-shaped profile compared with the cone-shaped interface (curve F). The local field enhancement, however, is comparable to the field intensity in the gas gap (curve A, E).

The composite-shaped profile is thus a good compromise which combines the advantage of the uniform field distribution of the optimum disc-shaped profile of FIG. 6 with that of the extended leakage distance of a cone-shaped interface of FIG. 8. The configuration of the spacer 35 combines a central optimum disc-shaped section 41 in a first support portion and an outer cone-shaped section 42 with a composite profile in the remaining support portion. Field calculations were made to evaluate the influence on the potential distribution along the composite profile of:

the relative proportion of the disc- and cone-shaped sections 41 and 42; and the transition profile connecting these two sections 41 and 42.

Figure 10:
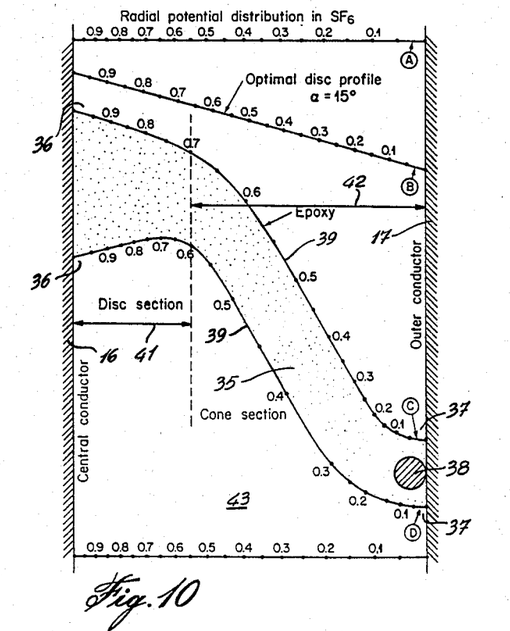
FIG. 10 is a graph showing the potential distribution at composite-shaped spacer interfaces of the cone of the present invention and also illustrating the composite shaped spacer profile.

Best results are obtained with a disc-shaped section 41 extending to $\frac{1}{3}$ of the gas gap and a sinusoidal profile to smooth out the transition between the two sections as illustrated in FIG. 10. With a cone-section angle of 30°, the composite-shaped spacer has a leakage distance of about 1.75 times the radial gas gap. The results of field calculations performed for this new spacer 35 configuration are presented in FIG. 10, which compares potential distributions along the spacer interfaces with radial field distributions in the gas (curve A) and along an optimum disc-shaped profile (curve B). The following observations can be made:

near the metal-epoxy-SF$_6$ junctions 36 and 37, the field distribution is quasi-uniform and comparable to the field along an optimum disc-shaped profile;

the cone section 42 is a region of particularly low field intensity;

owing to the tangential field intensity along the disc, and, particularly along the cone sections, which is lower than the radial field in the gas gap, flashover is unlikely to be initiated from the inner conductor-epoxy-SF$_6$ junction 36, or to propagate along the spacer interfaces 39;

the field enhancement at the outer envelope-epoxy-SF$_6$ junctions 37 may be the cause of flashovers initiating from these junctions but this could be forestalled by means of metal inserts 38, as already demonstrated with disc-shaped spacers.

Two composite-shaped spacers were molded, one without an insert 38, the other with, and were tested. The results are summarized in FIG. 9. It can be seen that without the metal insert, the dielectric performance of the spacer is slightly lower than the intrinsic dielectric performance of the test conductor (curves A, D). With the addition of a metal insert, the critical withstand voltage of the spacer is increased to the level of the test conductor without a spacer, for all gas pressures up to 0.4 MPa (curves A, E).

Examination of the traces left by successive flashovers occurring during the test shows that flashovers occurred at different points along the conductor surface. The trace of only one flashover out of 50 performed could be identified as having initiated from the outer junction and propagated along only part of the lower spacer interface; this flashover was most probably completed across the gas gap 43.

To fully assess the spacer configuration of this invention over the prior art disc-shaped spacers, a series of tests was performed to determine the critical withstand voltage of a conductor system with and without spacers under standard switching and lightning impulses. Two spacer configurations were studied: an optimum disc-shaped spacer and a composite-shaped spacer, both equipped with metallic inserts to assure the best performance possible. The results obtained for the switching and lightning impulse voltages are presented in FIGS. 12 and 13 respectively. The following observations may be made:

positive-polarity impulses yield higher withstand voltages than negative ones. The polarity effect is particularly pronounced at higher gas pressures;

the dielectric performance of both spacer configurations under impulse voltages is comparable to the intrinsic performance of the conductor system without spacers.

It is obvious from the described particular embodiments of my invention, and supported by experimental results, that an insulating spacer of the gas barrier type 12 made with the particular composite profile shape 35 of my invention would acquire an exceptional dielectric performance. The composite profile 35 can be incorporated to any existing design of supporting spacers to improve their intrinsic performance and that of the compressed gas insulated bus (FIG. 1).

From this profile optimization of the epoxy spacer of this invention for use in compressed-$SF_6$-insulated cables, the following conclusions can be made:

1. For simple cone-shaped interfaces, a range of optimal angles could be defined as a function of the relative dielectric constant $\epsilon_r$ of epoxy. For practical values of $\epsilon_r$, 5 and higher, the optimal dielectric cone angle ranges from 65° to 80°.

2. Metal inserts embedded in the epoxy can have a beneficial effect when located near the metal-epoxy-$SF_6$ junction, since they artifically reduce the local field intensity at these junctions.

3. The best ac performance obtained with the optimum disc-shaped spacer is about 85% of the intrinsic dielectric performance of the test conductor without spacer at the nominal operating gas pressure of 0.4 MPa.

4. With cone-shaped spacers the advantage of increased leakage distance is more than offset by the detrimental effect of the non-uniform field distributions along the spacer interfaces, especially at the lower one.

5. The developed composite-shaped spacer is a good compromise which combines the advantage of the uniform field distribution of a disc-shaped profile with that of the very low tangential field along a cone-shaped profile due to its extended leakage distance.

6. Experimental results obtained with composite-shaped spacers indicate an ac dielectric performance comparable to the intrinsic dielectric performance of the test conductor.

7. Under impulse voltages, both the optimum disc-shaped and the composite-shaped spacers show a dielectric performance comparable to that of the conductor system without spacers.

I claim:

1. A spacer comprising a composite profile shaped body formed of an electrically insulating material to support a central conductor substantially concentric in a tubular outer sheath, said body having a disc section configuration in a first support section to be located immediate the central conductor to obtain substantially uniform field distribution at the first support section, said disc section having opposed convergent surfaces extending substantially symmetrically in said first support section, said body further having a cone section configuration in a remaining support section which is to extend to the outer sheath to obtain a low field intensity on the opposed surfaces of said spacer in the remaining support section, and a contact angle defined between each said opposed convergent surfaces and the central transverse axis of the spacer inwardly of said opposed convergent surfaces and being in the range of about 65° to 80°.

2. A spacer as claimed in claim 1 wherein a conductive annular insert is embedded in said spacer at an outer sheath contact end to be placed in contact with said outer sheath to substantially reduce the field intensity in the contact area between said spacer and said outer sheath and hence reducing the probability of initiating an electrical breakdown in said contact area.

3. A spacer as claimed in claim 1 wherein each said contact angle is approximately 75°, said insulating material having a relative dielectric constant of 5 or higher.

4. A spacer as claimed in claim 1 wherein said remaining support section of said spacer extends at an angle of approximately 30° with respect to the central transverse axis of said spacer.

5. A spacer as claimed in claim 1 wherein said first support section extends approximately one third the distance of the radial distance of said spacer body.

6. A compressed gas insulated high voltage bus of co-axial configuration including a central conductor, a tubular outer sheath, and a plurality of spacers, each said spacer having a composite profile shaped body formed of an electrically insulating material and extending radially in an area between said central conductor and said outer sheath in a spaced apart manner to support said central conductor substantially concentric with said outer sheath, said body having a disc section configuration in a first support section adjacent said central conductor to obtain substantially uniform field distribution in an area immediate said central conductor, said disc section having opposed convergent surfaces extending substantially symmetrically in said area immediate said central conductor, said body further having a cone section configuration in a remaining support section extending to said outer sheath to obtain a low field intensity on the opposed surfaces of said spacer in the remaining portion of said area extending to said outer sheath, and a contact angle defined between each said opposed convergent surfaces and said central conductor inwardly of said opposed convergent surfaces and being in the range of about 65° to 80°.

7. A high voltage bus as claimed in claim 6 wherein a conductive annular insert is embedded in each said spacer at an outer sheath contact end placed in contact with said sheath to substantially reduce the field intensity in the contact area between said spacer and said outer sheath and hence reducing the probability of initiating an electrical breakdown in said contact area.

8. A high voltage bus as claimed in claim 6, wherein each said contact angle is approximately 75°, said insulating material having a relative dielectric constant of 5 or higher.

9. A high voltage bus as claimed in claim 6 wherein said remaining support section of each said spacer extends at an angle of approximately 30° with respect to the longitudinal axis of said central conductor.

10. A high voltage bus as claimed in claim 6 wherein said first support section extends approximately one third the distance separating said central conductor from said outer sheath.

* * * * *